US006580951B2

United States Patent
Cooper et al.

(10) Patent No.: US 6,580,951 B2
(45) Date of Patent: Jun. 17, 2003

(54) COMMUNICATIONS DISTRIBUTION APPARATUS AND METHOD

(75) Inventors: Alan N. Cooper, Addison, TX (US); David W. Bauerle, Argyle, TX (US)

(73) Assignee: Ultrak, Inc., Lewisville, TX (US)

( * ) Notice: Subject to any disclaimer, the term of this patent is extended or adjusted under 35 U.S.C. 154(b) by 206 days.

(21) Appl. No.: 09/879,893

(22) Filed: Jun. 13, 2001

(65) Prior Publication Data

US 2002/0194318 A1 Dec. 19, 2002

(51) Int. Cl.[7] .............................................. G05B 11/01
(52) U.S. Cl. ............................. 700/21; 700/79; 700/83; 713/200; 713/201; 713/202; 709/201; 709/223; 709/219
(58) Field of Search .............................. 700/21, 83, 79, 700/89; 713/200, 201, 202; 709/201, 202, 203, 223, 219, 224, 225

(56) References Cited

U.S. PATENT DOCUMENTS

| | | | |
|---|---|---|---|
| 4,337,458 A | | 6/1982 | Cohn et al. |
| 5,184,124 A | | 2/1993 | Molpus et al. |
| 5,477,531 A | * | 12/1995 | McKee et al. ............... 370/249 |
| 5,600,316 A | | 2/1997 | Moll |
| 5,659,787 A | | 8/1997 | Schieltz |
| 5,689,566 A | * | 11/1997 | Nguyen ....................... 713/155 |
| 5,770,533 A | | 6/1998 | Franchi |
| 5,793,763 A | * | 8/1998 | Mayes et al. ................ 370/389 |
| 5,801,625 A | | 9/1998 | Wang |
| 5,802,522 A | | 9/1998 | Lloyd et al. |
| 5,818,877 A | | 10/1998 | Tsai et al. |
| 5,884,042 A | | 3/1999 | Winter et al. |
| 5,886,894 A | * | 3/1999 | Rakoff ........................... 700/3 |
| 5,909,548 A | | 6/1999 | Klein et al. |
| 5,929,794 A | | 7/1999 | Hayakawa et al. |
| 5,977,889 A | | 11/1999 | Cohen |
| 5,995,916 A | * | 11/1999 | Nixon et al. ................. 702/182 |
| 6,002,995 A | | 12/1999 | Suzuki et al. |

* cited by examiner

Primary Examiner—Ramesh Patel

(57) ABSTRACT

A computer system and method for distributing, decisions in a network. The network is partitioned into multiple levels including a user interface level, a gateway level and a domain level. All attached devices in the network communicate either directly or indirectly with user interface unit. Several gateway systems are attached to the user interface level. Each gateway system has decision-making capability. Each gateway system has connected to it multiple domains. Each domain level again has a set of decision-making capabilities. When the domain level receives an input, the domain level decides whether or not it may react based upon its decision-making capabilities. The domain system may react to the input and provide the gateway with a report of the event and the domain system's reaction to it. Once the gateway system receives the event and domain system status, the gateway determines whether to react to this event. The gateway may react to this event and direct the domain system to act according to its predetermined programming. The gateway system then sends to the user interface system the event, the domain system status and the gateway system status. The status includes whether the domain or gateway systems have reacted to the event. At the user interface level, the user interface system determines whether to react to this event and then provides a notice to the user, which allows the user to input an action.

25 Claims, 4 Drawing Sheets

COMMUNICATIONS DISTRIBUTION APPARATUS AND METHOD

CROSS-REFERENCE TO RELATED APPLICATIONS

Not Applicable.

STATEMENT REGARDING FEDERALLY SPONSORED RESEARCH OR DEVELOPMENT

Not Applicable

FIELD OF THE INVENTION

The field of the invention relates to a hierarchical networking structure for a computer-implemented security system, including video cameras, VCRs, locks, alarms and other security devices.

BACKGROUND OF THE INVENTION

For many years individuals have used computer systems to do repetitive, mathematic intensive calculations. Computer systems have been able to do basic elemental decision-making based upon a predetermined response to a given set of criteria. As computer systems have proliferated throughout society, computer systems of various levels of capabilities have developed. Highly advanced computer systems with powerful decision making tools are available as are machines with just a few basic computer decision-making skills. Further, a wide variety of computer systems or machines with computing capability are available with varying degrees of decision-making capabilities. However, one recurring theme appears; that the decision-making capability in a networked system has been centralized in one advanced computer system. These networks which center around one powerful decision-making computer system are provided in many different hierarchies, examples of which are shown in U.S. Pat. No. 5,995,916 entitled "Process Control System for Monitoring and Displaying Diagnostic Information of Multiple Distributed Devices" issued to Nixon et al and U.S. Pat. No. 5,886,894 entitled "Control System for Automated Security and Control Systems" issued to Rakoff.

Further, security systems of varying degrees of intelligence have been available for many years. Basic security systems are available with limited decision-making capabilities and are even available with no decision-making capabilities, just relays. An example of this is a door alarm attached to a speaker. Once the door alarm contact is broken, the speaker provides an audible output signaling that the door has been opened. However, more sophisticate~systems have become available and security elements have evolved with differing levels of decision-making capabilities. However, the decision making capabilities in these security systems exist in a centralized computer system. Therefore, in a security system computer network, multiple layers of security devices and computing systems may be attached, however the attached computer systems and security system devices report inputs they receive to the centralized computer system and receive instructions from the centralized computer without implementing individual decision-making capabilities. U.S. Pat. No. 5,995,916 discloses a system in which a main, controlling decision-making computer system has attached to it several controller computer systems that are further attached to a plurality of field devices. The field devices report occurrences of inputs they receive to the controller computer system. The control routines configure the data and pass it up to a main controller computer system. The main controller computer system then provides output to the controlling systems. The controlling systems then configure this information so it can be sent to the field devices. As can be seen, this hierarchical system allows for raw data to be passed from the bottom up to the decision-making computer system and then allows for the decision-making computer system to pass instructions down to the field devices. A second hierarchical structure is shown in U.S. Pat. No. 5,886,894. In this system, a main computer decision-making system is disclosed with a master unit connected to several slave units. This is commonly referred to as a wagon wheel hierarchy. The slave units receive inputs and pass these inputs into the main computer decision-making system. The computer decision making system obtains all the inputs from the multiple slave units and then based upon its decision-making capabilities sends instructions out to the various slave units. However, the decision-making capabilities for both of these systems reside in a centralized location. Therefore, any advancement in the ability to distribute the decision-making process throughout the computer security system network would be advantageous.

SUMMARY OF THE INVENTION

A computer system and method for distributing decisions in a network. The network is partitioned into multiple levels including a user interface level, a gateway level and a domain level. The user interface system allows a user to participate in the decisions and contains a large mass storage capability. All attached devices in the network communicate either directly or indirectly with user interface system. Several gateway systems are attached to the user interface system. The gateway systems contain the majority of the decision-making capabilities. The gateway systems also have the ability to provide inputs and outputs based on the inputs provided to it. Each gateway system has connected to it multiple domain systems. Each domain system has a reduced set of decision-making capabilities, however, each domain system has the ability to react to a series of inputs without receiving instruction from the gateway system. When a domain system receives an input, the domain system determines whether it may react based upon its decision-making capabilities. If it may, then the domain system reacts to the input and provides the gateway system with a report of the event and the domain system's reaction to it. Once the gateway system receives the event and status of the domain system, the gateway system determines whether it has the capability to react to this event. If the gateway system has the capability to react to this event, then it directs one or more of the domain systems according to its predetermined programming. The gateway system then passes to the user interface system the event, the domain system's status and the gateway system's status. The statuses include whether the domain or the gateway systems have reacted to the event. At the user interface level, the user interface system determines whether it has the capability to react to this event and then provides a notice to the user and allows for the user to input any action in which the computer system is to take.

A BRIEF DESCRIPTION OF THE DRAWINGS

A better understanding of the present invention can be obtained when the following detailed description of one exemplary embodiment is consider in conjunction with the following drawings, in which.

DETAILED DESCRIPTION OF EXEMPLARY EMBODIMENTS

Figure 1:
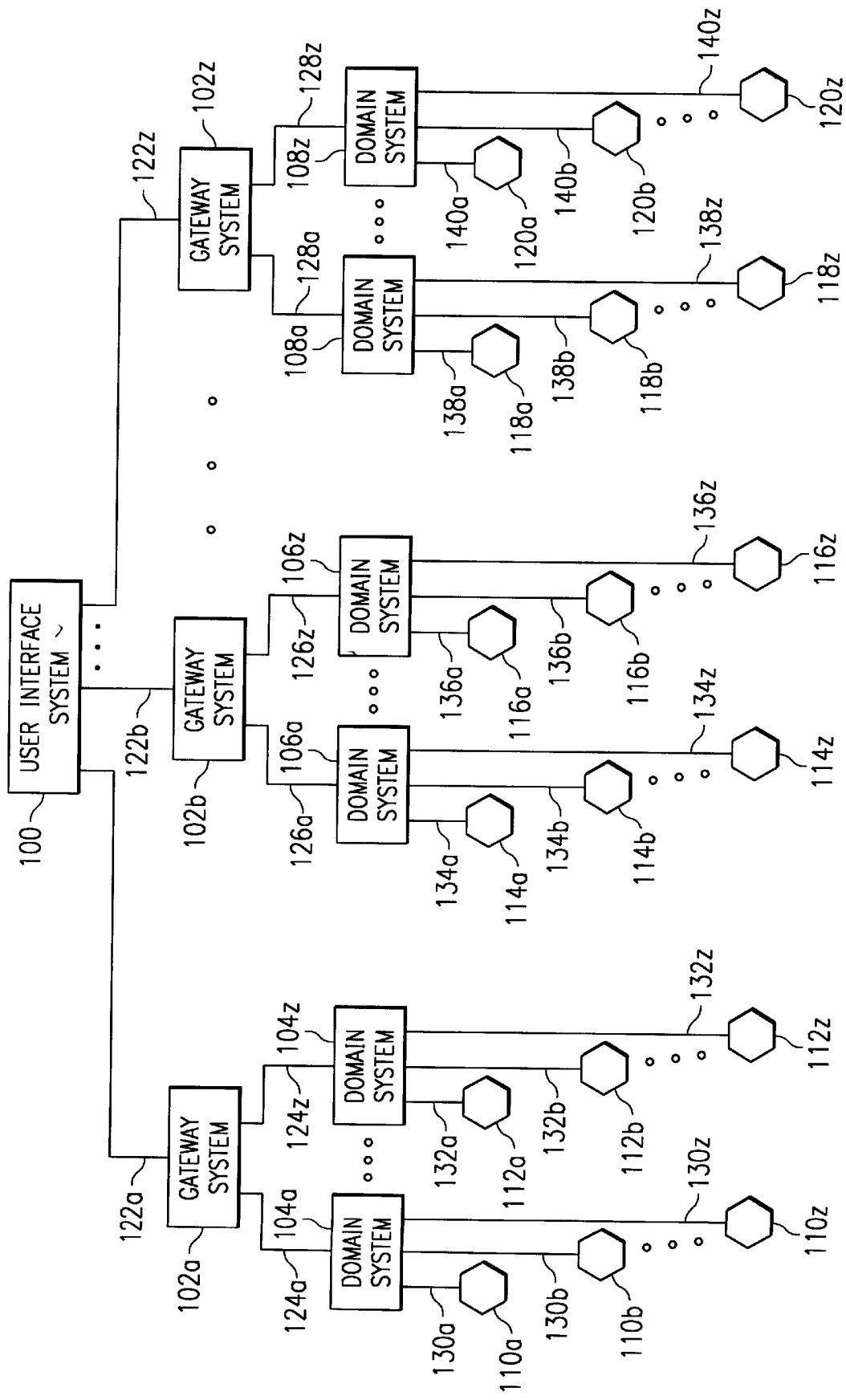
FIG. 1 is a block diagram depicting the computer system according to the invention.

In the description that follows, like parts are marked throughout the specification and drawings with the same reference numerals, respectively. The drawing figures are not necessarily drawn to scale and certain figures may be shown in an exaggerated or generalized form in interest of clarity and conciseness.

FIG. 1 illustrates the block diagram of the computer system according to the present invention. A user interface system 100 is shown. The user interface system 100 is of the kind generally available to individuals or organizations that need network servers. The user interface system 100 is connected to multiple gateway systems 102a, 102b through 102z via communication lines 122a, 122b through 122z respectively. Communications lines 122 are preferably a standard telephone or direct communication line. Each gateway system 102a through 102z is connected to multiple domain systems 104a through 104z, 106a through 106z and 108a through 108z, respectively. The gateway systems 102a through 102z are connected to domain systems 104a through 104z, 106a through 106z and 108a through 108z via communications lines 124a through 124z, 126a through 126z and 128a through 128z respectively. Each domain system 104a through 104z, 106a through 106z and 108a through 108z are connected to field systems 110a, 110b through 110z, 112a, 112b through 112z, 114a, 114b through 114z, 116a, 116b through 116z, 118a, 118b through 118z and 120a through 106z and 108a through 108z are connected to the field systems 110a through 110z, 112a through 112z, 114a through 114z, 116a through 116z, 118a through 118z and 120a through 120z through communication lines 130a through 130z, 132a through 132z, 134a through 134z, 136a through 136z, 138a through 138z and 140a through 140z respectively. Decision making capabilities exist in all levels of the system. Information flows from the field systems level up through the domain systems level, through the gateway system level to the user interface system level and commands or instructions flow from the user interface system level through the gateway system level to the domain system level to the field system units. For example, if a sensor is activated in field system unit 114b, the field system unit 114b determines if the field system unit 114b may react due to the sensor input or event. If the field system unit 114b has been programmed to respond to this particular input, then the field system unit 114b will cause an action to be performed. Regardless of whether field system unit 114b reacts to the sensor input, the event and the field system 114b statuses are transmitted via the communication line 134b to the domain system 106a. The domain system 106a determines if the domain system 106a may react to the sensor input received at the field system 114b. The domain system 106a may respond by directing the field system 114b to react or may cause one or more other field system 114a, 114c through 114z under its control to react; for "ample, sending a command to field system 114a. Then, the domain system 106a sends notice of the event, the status of the Field systems 114a through 114z, and the status of domain system 106a to gateway system 102b via communication line 126a. At the gateway system 102b, the gateway system 102b determines whether an action is required based upon the information received from the domain system 106a. The gateway system 102b may react by providing a command to domain system 106a, which is then passed on to any of the field systems 114a through 114z. Further, the gateway system 102b may send a command to domain system 106z via communication line 126z to command any of the field units 116a, 116b through 116z to react in a certain way. Then the gateway system 102b notifies the user interface system 100 through communication line 112b of the event, the field systems status, the domain systems status and the gateway system status. Thus, the decision-making capability is distributed through the multiple layers.

Figure 2:
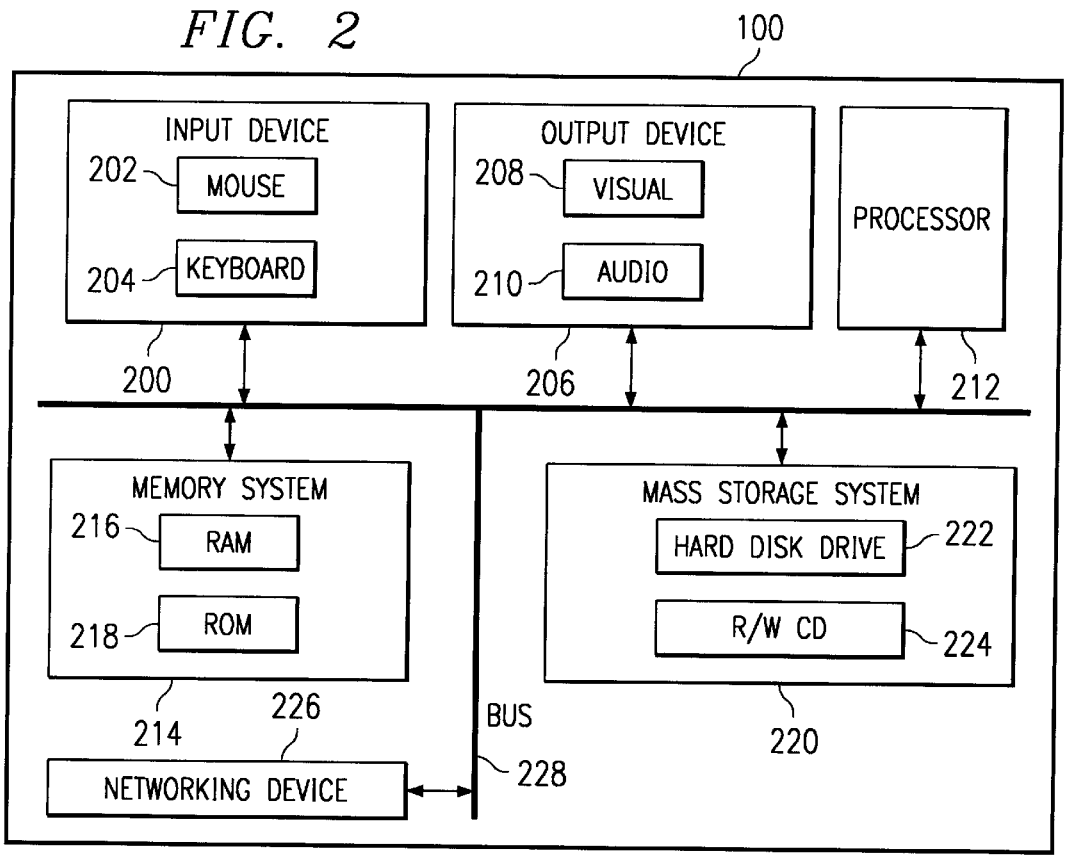
FIG. 2 is a block diagram depicting the user interface system according to the invention.

Referring now to FIG. 2 a block diagram of the user interface system is shown. The user interface system 100 includes an input device 200 which further includes a mouse 202 and a keyboard 204. The input device 200 is connected via a bus 228 to an output device 206. The output device includes a visual device 208 and an audio device 210. The output device 206 is connected via the bus 228 to a processor 212. Further, a memory system 214 is connected to the bus 228 and includes a Random Access Memory (RAM) 216 and a Read Only Memory (ROM) 218. A networking device 226 is connected to the bus 228. A mass storage system 220 is connected to the bus 228 and includes a hard disk drive system 222 and a Read/Write CD 224. The user interface system 100 is typically a server-based system which is commonly available through manufacturers such as Dell Computer Corporation. The user interface system 100, in one disclosed embodiment, is shown as a single computing machine, however, multiple machines of varying capabilities may be included without departing from the spirit of the invention. The visual device 208 typically includes a computer monitor and may include other devices such as warning lights. The audio device 210 typically includes a speaker system common to computer systems; however, other devices such as bells or whistles may be used without distracting from the spirit of the invention. The input devices can include a bar card readers or scanners and may be implemented without departing from the spirit of the invention. The mass storage system 220 may further include an optical storage device or tape devices for storage of large amounts of data. The user interface system 100 may be designed such that all data messages received from any device are stored in the: mass storage devices and all commands sent from the user interface system may also be stored in the mass storage system. The speed and size of the mass storage system may vary depending on the specific needs of a customer. However, different sizes and types of the mass storage system 220 may be implemented without departing from the spirit of the present invention.

The user interface system 100 includes hardware and software resident in the hardware. This software allows the user interface system 100 to automatically respond to certain events received at the user interface system 100 or allows the user interface system 100 to prompt a user for a command, and then once a command has been received, to pass the command down to the gateway systems 102a through 102z. An example of an event in which the user interface system 100 automatically responds is if an entry request is received from the gateway system 102b identifying a particular individual swiping an identification card. The user interface system 100 software then compares that entry identification to information stored in the mass storage system 220 to determine if that individual can be granted access. If the individual has access rights, then the command to allow entry is sent from user interface system 100 to the gateway system 102b. However, if the individual's entry identification is not present in the user interface system 100 mass storage system 220, then the user may be prompted, via the output device 206, to request entry of the individual. The user may enter a command through the input device 200 which is sent from the user interface system 100 to the gateway system 102b to command entry of the individual. As was discussed, the user interface system 100 may include several computing systems with varying functions. The user interface system 100 may include computing systems designed for storage of large scale databases; while: other computing systems of the user interface system 100 may be designed for the rapid input and output of data to the user. The mass storage system 220 may also include backup devices which allow for the databases and any other software and data within user interface system 100 to be backed up on a separate physical medium in case of a computer malfunction. Further, the configuration data for all devices of the security system may be stored in the mass storage system 220 of the user interface system 100 and be accessible during initialization of any of the devices, including the devices at the gateway system level, the domain system level and the field system level. The controlling and decision-making software (not shown in the drawings) is resident in either the mass storage system 220 or the memory system 214 of the user interface system 100 and is executable upon initialization or manually by the user.

Figure 3:
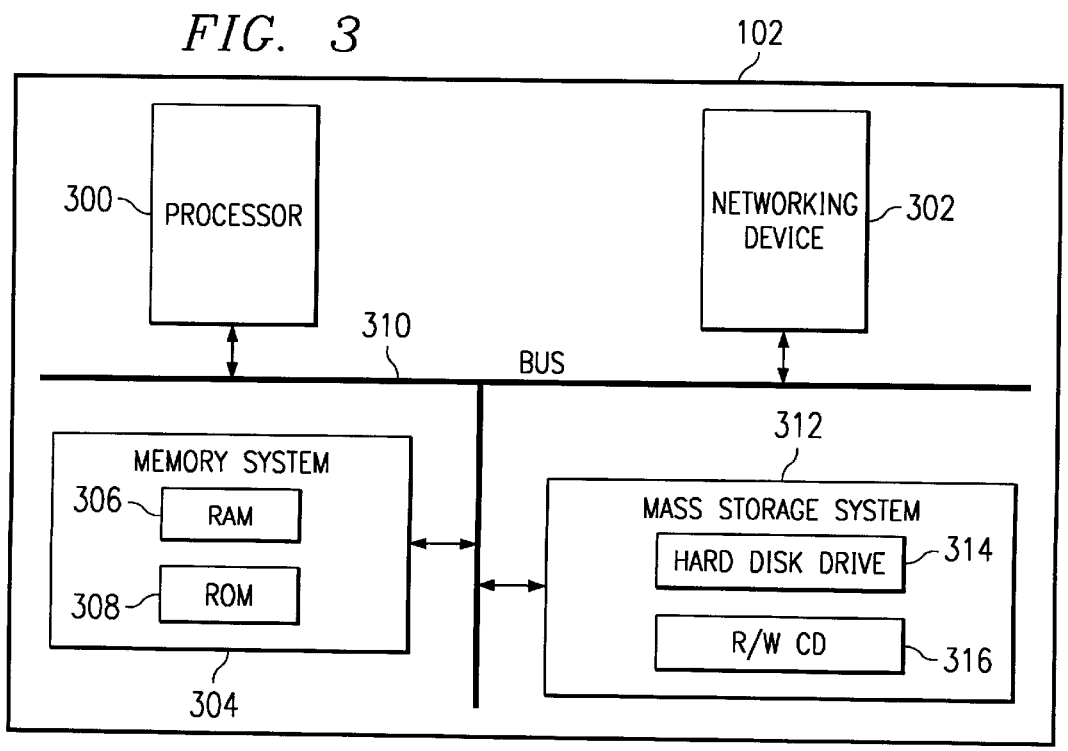
FIG. 3 is a block diagram depicting the gateway system according to the invention.

Referring now to FIG. 3, a block diagram of the gateway system is shown. An exemplary gateway system 102 is shown including a processor 300 connected via a bus 310 to a network device 302, a memory system 304 and a mass storage system 312. The memory system 304 includes a RAM 306 and a ROM 308. The mass storage system 312 includes a hard disk drive 314 and a Read/Write CD 316. The gateway system 101 typically is a personal computer system available to an individual user or it can be a computer server typically available to businesses. The gateway system 102 may include input and output devices allowing for a user to make direct communication to the gateway system 102, however, in this disclosed embodiment they are not shown. The input and output devices would allow a user to directly access the gateway system 102 for maintenance and initialization. A computer program or software (not shown) is resident in either the memory system 304 or the mass storage system 312. The computer program is activated when the gateway system 102 is initiated or upon a command from the user interface system 100. The computer program allows for the gateway system 102 to receive events from the computer systems at the domain level, possibly react to the event, send information to the user interface system 100 and receive commands from the user interface system 100. If an event is outside of the programmed capabilities of the a gateway system 102, then the gateway system 102 does not react other than to notify the user interface system 1001 of the event and the gateway systems 102 status. Further, if the gateway system 102 responds to the event, then the status of the gateway system 102 is sent to the user interface system 100.

In one embodiment, the gateway system 102 includes the majority of the decision-making capability. This decision-making capability is resident in the gateway system 102 hardware and software resident in the memory system 304 or the mass storage system 312. By providing the decision-making capability in this lower level computer system, the speed of the decision-making is greatly increased. For example, if an individual wishes to enter a building, the individual may slide an entry card through a card reader. In the prior art, the identification of the individual would be sent up through the different levels to the centralized computer. The centralized computer would then compare the requested individual's identification stored in the centralized computer to determine if a match has occurred then, the centralized computer would send the instructions back down through the levels to the entry point and either allow or not allow the individual to enter. In the present invention, the decision-making capability is moved from the centralized computer to one of the computer systems closer to the event point. If an individual wishes to enter a building and slides an identification card through an 10 identification card reader, the identification request may be sent up through the field system 110 to the domain system 104 to the gateway system 102. The gateway system has the capability to store individual identification data in its mass storage system 312 and may have the decision-making capability to determine whether to allow entry of this individual. Therefore, the step of passing this information up to the user interface system 100 is removed and the decision to allow entry of the individual can be made at the gateway system 102. This advantage is further amplified by allowing the decision making capabilities to be dispersed and distributed to the domain systems level and the field systems level, depending upon the capabilities of the specific systems. Thus, if the field system 110 includes a small mass storage device which includes the identification of a few users, the individual wishing to have entry may have his identification stored at the field system 110 and thus have immediate access without the necessity to pass the request up through the varying levels of the security system network. However, if an individual's identification is not contained in the lower level computing systems, then the request is passed up to the next higher level to determine if the event can be handled at that level. Another advantage of this system is redundant wiring, as it is commonly shown in the prior art, is unnecessary. When the lower level computing systems maintain decision making capabilities, then a disconnection of the lower level systems from the central computing system will not stop all activity at the lower level computing systems. In the present invention, the lower level computing systems can continue to function on their limited decision-making ability. Not all events can be handled as each lower level system is limited to its capabilities, however, the lower level computing systems will continue to function at some level. Further, in the present invention, when communication between the multiple levels is reestablished, all events that have occurred while the lower level systems have been disconnected from the user interface system 100 are sent through the multiple levels as is disclosed herein and thus the user interface system 100 is able to maintain an accurate and reliable event status log of all events that have occurred, even if the user interface system 100 was not directly communicating with all lower level computer systems throughout the period in question.

Figure 4:
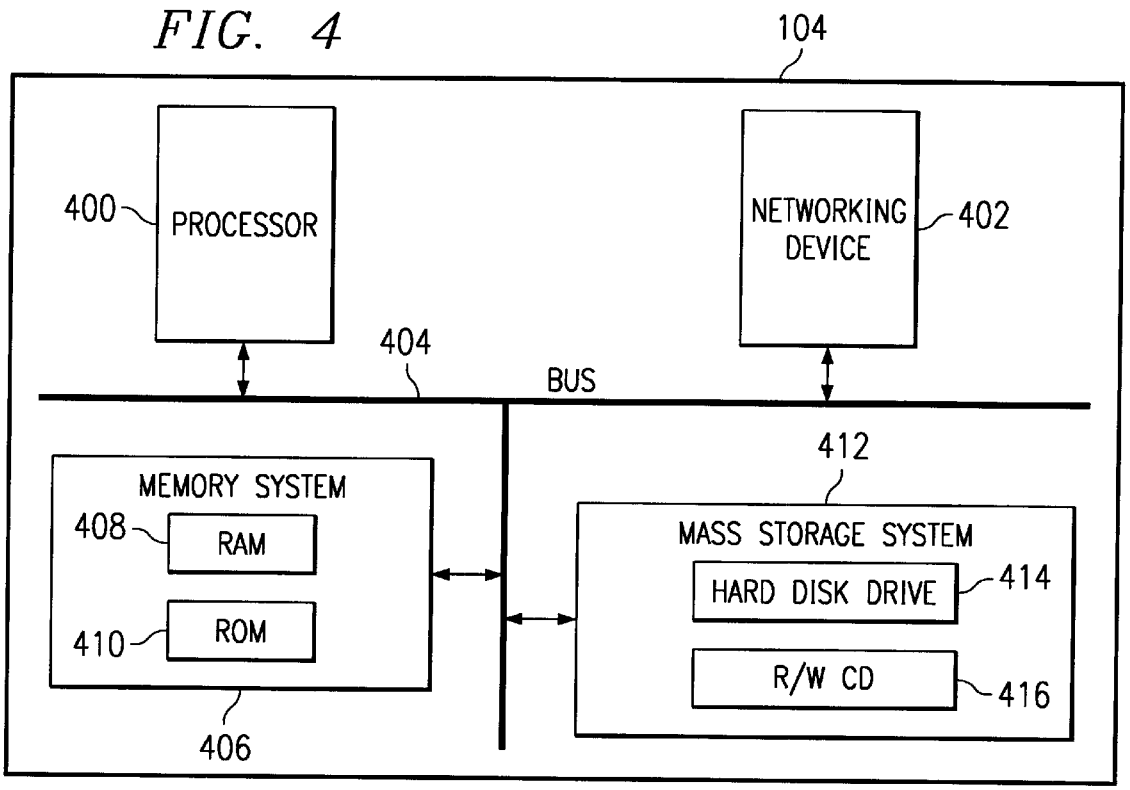
FIG. 4 is a block diagram depicting the domain system according to the invention.

Referring now to FIG. 4 a block diagram of the domain system is shown. An exemplary embodiment of the domain system 104 includes a processor 400 connected via a bus 404 to a networking device 402, a memory system 406 and a mass storage system 412. The memory system 406 includes a RAM 408 and a ROM 410. The mass storage system 412 includes a hard disk drive 414 and a Read/Write CD 416.

The domain system 104 includes software resident in the memory system 406 or the mass storage system 412 that is executed upon initiation of the domain system 104 or upon command from the gateway system 102. The software includes decision-making capabilities. Thus, when the domain system 104 receives an event or an input, the domain system 104 evaluates the event against its preprogrammed list of options. If the event is an event in which the domain system 104 can respond, then domain system 104 reacts to the event. Next, the domain system 104 will send the event and the status of the domain system 104, whether or not the domain system 104 responded to the event, to the gateway system 102 via the networking device 402. The domain system 104 may be connected to multiple field system level devices or the domain system 104 may be the lowest level device in the network. Thus, the domain system 104 may be an intelligent field unit, such as scanning unit.

The domain system 104 typically includes a subset of capabilities from the gateway system 102. The domain system 104 may include a smaller mass storage system 412 and slower or less capable processors 400. Typically, the processor 400 of the present invention includes eight (8) bit and sixteen (16) bit processors.

Figure 5:
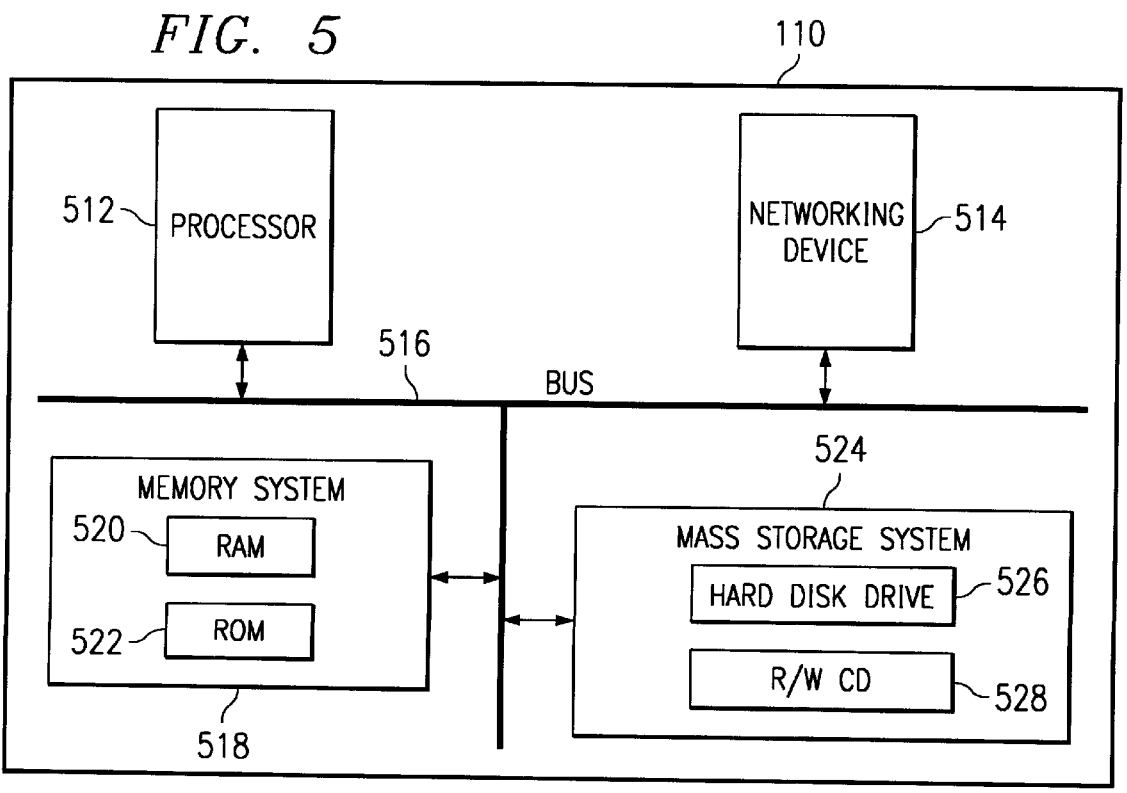
FIG. 5 is a block diagram of an intelligent field device according to the invention.

Referring to FIG. 5, a block diagram of an intelligent field system is shown. The intelligent field system 110 includes a processor 512 connected via a bus 516 to a networking device 514, a memory system 518, and a mass storage system 524. The memory system 518 includes a RAM 520 and a ROM 522. The mass storage system 524 includes a hard disk drive 526 and a Read/Write CD 528. The intelligent field system 110 includes software resident in the memory system 518 or the mass storage system 524 that is executed upon initialization of the intelligent field system 110 or upon command from the domain system 104. The software allows the field system 110 to sense an event, and if the event is within a preprogrammed capability list, to respond to that event before sending the event and field system status to the domain system 104.

The intelligent field systems 110 include fingerprint readers, card readers, video recorders, video cameras, scanners, and a variety of other security devices, all of which may implemented without departing from the spirit of the invention. The field system 110 may also include devices which are labeled non-intelligent. Such devices would include locks, alarms, motion detectors, and other devices which do not require computing capability to function. Such devices, when implemented, do not detract from the spirit of the invention. When non-intelligent field systems 110 are implemented, then the output from these non-intelligent field systems 110 is sent to the domain system 104 when the event occurs.

Figure 6:
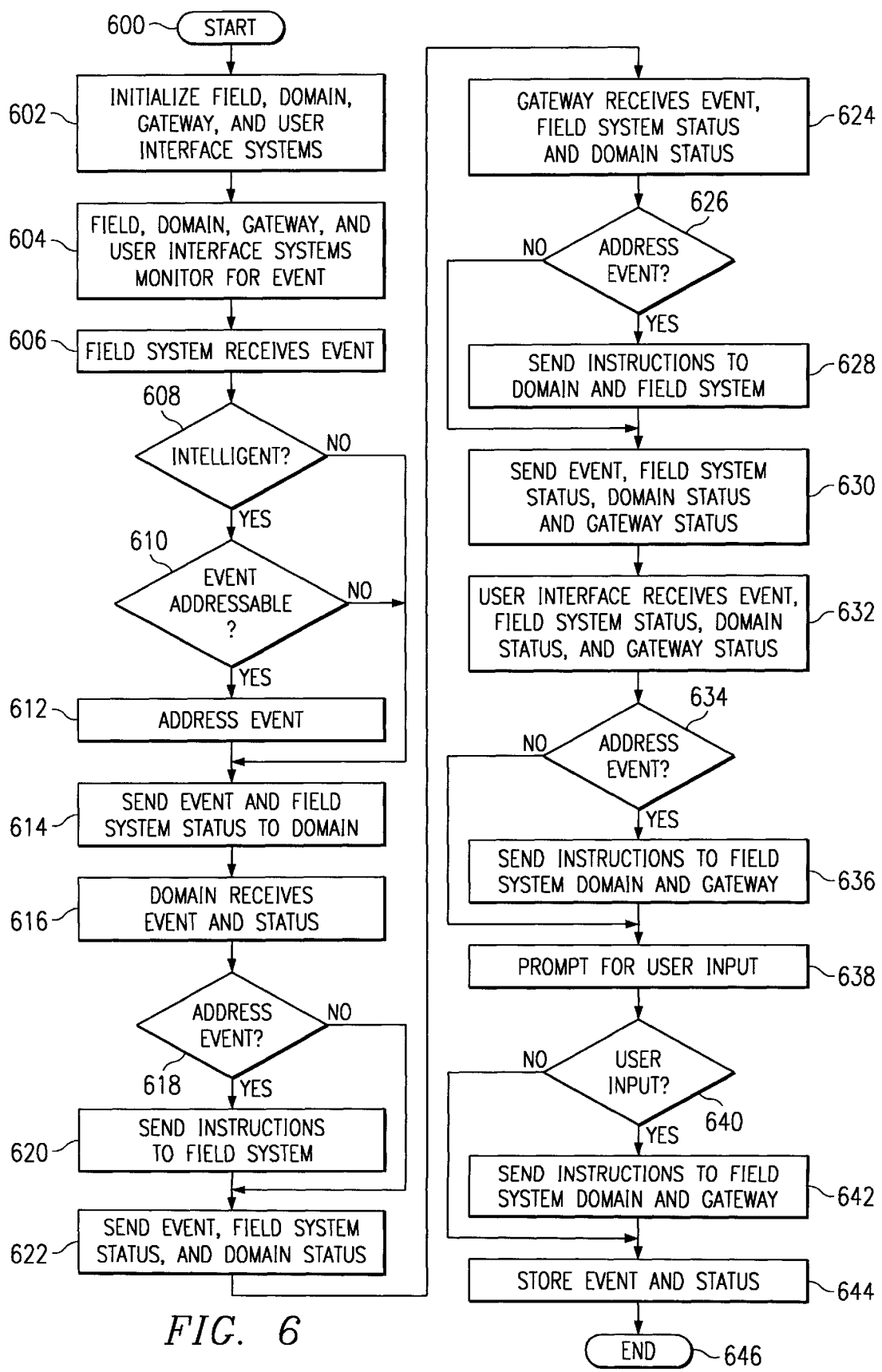
FIG. 6 is flow diagrams of the distributed decision-making process.

FIG. 6 is a flow diagram of the distributed decision-making process. The process begins with start 600. Next, in step 602, the field systems, domain systems, gateway systems, and the user interface systems are initialized. During the initialization process, the software resident in these systems is executed. Alternatively, the user can command execution of the software after initialization. In step 604, the field systems, domain systems, gateway systems, and user interface systems begin monitoring for an event. An event includes any input into the field system or the domain system if there are no field systems attached to the domain system. For instance, an event may be the activation of a sensor, a door being opened, the sliding of a card through a card reader or an alarm if the motion detector detects motion. Next in step 606, a field system receives an event. The field system then determines if it has decision-making capability in step 608. If there is no decision-making capability in the field system, then the process continues with step 614. If the field system is an intelligent unit, as determined in step 608, then the field system determines if the event received is addressable by the field system in step 610. If the event is not addressable by the field system, then the process continues to step 614. If the event is addressable by the Field system in step 610, then the Field system addresses the event in step 612. Next, in step 614, the notification of the event and the status of the field system are sent to the domain system. The event and the field system status are sent to the domain system regardless of whether the field system has addressed the event. Thus, the event and the status of the field system are always sent to the domain system upon receipt of an event. In step 616, the domain system receives the event and the field system status. The domain system determines whether the domain system may react and address the event in step 618. If the domain system is capable of addressing the event, then the domain system sends instructions to field system in step 620. Next in step 622, the domain system sends the event, field system status and the domain system status to the gateway system. This step is done regardless of whether the domain system reacted to the event. In step 624, the gateway system receives the event, field system status and domain system status. The gateway system 15 determines if it is capable of addressing the event in step 626. If yes, then the gateway sends instructions to the domain system and possibly to the field systems through the domain system in step 628. If no, then the event, field system status, domain system status and gateway system status are sent to the user interface system in step 630. Again, this step is implemented regardless of whether the gateway system reacted to the event. Next, in step 632, the user interface system receives the event, field system status, domain system status, and gateway status. In step 634 the user interface system determines if it is capable of addressing the event. If yes, then the user interface system sends instructions to the gateway system and possibly the field system and domain system. In step 638, the user interface system prompts the user for input. Next, in step 640, the user interface system determines if the user has provided any input. If yes, then the user's instructions are sent to the gateway system and possibly the field systems and domain systems in step 642. Next, in step 644, the event, field system status, domain system status, gateway status and user interface status are stored in user interface system's mass storage system. The process ends in step 646.

In one embodiment of the present invention, the varying levels of the network are not limited to responding only to the lower level devices that sent the event. For example, the domain system 104a may react to an event from field system 110a by commanding field system 110c to commence operation. Further, the gateway system 102a may react to an event transmitted by domain system 104b, by directing domain system 104x to direct a field unit under that domain system to commence an action. Further, the user interface system 100 may react to the same event by commanding different gateway system to react.

The foregoing disclosing the description of the invention are illustrative and explanatory thereof and various changes to size, shape, material, components, and order may be without departing from the spirit of the invention.

What is claimed is:

1. A method of distributing decisions in a network including a user interface level, a gateway level, and a domain level, the method comprising the steps of:

receiving data at a domain in the domain level;

deciding at the domain if the domain is to react;

reacting to the data or sending the data to a gateway in the gateway level;

deciding at the gateway if the gateway is to react;

reacting to the data or sending the data to a user interface in the user interface level;

deciding at the user interface if the user interface is to react; and reacting to the data or not reacting to the data.

2. The method of claim 1, wherein the step of the domain receiving data at the domain level includes receiving data from a field device.

3. The method of claim 2, wherein the step of the domain reacting to the data includes providing instructions to the field device.

4. The method of claim 1, wherein the step of the gateway reacting to the data includes providing instruction to the domain.

5. The method of claim 1, wherein the step of the user interface reacting to the data includes providing instructions to the gateway, wherein the gateway then provides instructions to the domain.

6. The method of claim I further comprising the step of storing the data in the user interface level.

7. The method of claim I further comprising the steps of sending the data and the decision to react to the gateway if the domain reacts; sending the data and the decision to react to the user interface if the gateway reacts.

8. The method of claim 1, wherein the step of the user interface deciding to react includes:

outputting the data to a user; and receiving input from the user.

9. The method of claim 1, wherein the step of the user interface not reacting to the data includes storing the data.

10. The method of claim 2, wherein the step of receiving data from the field device includes receiving data from at least one field device.

11. The method of claim 10, wherein at least one field device is a plurality of field devices.

12. The method of claim 1, wherein the step of the gateway receiving data from the domain includes receiving data from at least one domain.

13. The method of claim 12, where at least one domain is a plurality of domains.

14. The method of claim 1, wherein the step of the user interface receiving data from the gateway includes receiving data from at least one gateway.

15. The method of claim 14, wherein at least one gateway includes a plurality of gateways.

16. A security system on a network of at least three levels comprising:

a user interface system, wherein the user interface system includes a processor, a user input device, a user output device, a memory system and a networking device;

a gateway system connected to the user interface system through the network, the gateway system including a processor, a memory system and a networking device;

a domain system connected to the gateway system through the network, the domain system including a processor, a networking device, a memory system, an output device and an input device;

software resident in the user interface system, the software when executed performing the steps of:

receiving data from the gateway system;

deciding to react; and reacting to the data or not reacting to the data software resident in the gateway system, the software when executed performing the steps of:

receiving data from the domain system;

deciding to react; and reacting to the data or sending the data to the user interface system; software resident in the domain system, the software when executed performing the steps of:

receiving data;

deciding to react; and reacting to the data or sending the data to the gateway system.

17. The security system of claim 16 further comprising a field system connected to the domain system through the network.

18. The security system of claim 17, wherein the domain system software steps of receiving data includes receiving data from the field system.

19. The security system of claim 17, wherein the field system includes a field system with a processor and a network device.

20. The security system of claim 17, wherein the field system includes field system with a sensor.

21. The security system of claim 17, wherein the field system includes a sensing device hardwired to the domain system.

22. The security system of claim 16, wherein the user interface system includes a user interface system with a mass storage device.

23. The security system of claim 22, wherein the user interface system software step of not reacting to the data includes storing data in the mass storage device.

24. The security system of claim 16, wherein the gateway system includes a gateway system with a mass storage device.

25. The security system of claim 16, wherein the domain system includes a domain system with a mass storage device.

* * * * *